US011859090B2

(12) United States Patent
Balaguru et al.

(10) Patent No.: US 11,859,090 B2
(45) Date of Patent: *Jan. 2, 2024

(54) PROTECTIVE COATINGS FOR GALVANIZED STEEL

(71) Applicant: Zirconia Inc., Tukwila, WA (US)

(72) Inventors: Balamuralee Venkatesalu Balaguru, Seattle, WA (US); Benjamin Theodore Cook, Seattle, WA (US)

(73) Assignee: Zirconia Inc., Tukwila, WA (US)

( * ) Notice: Subject to any disclaimer, the term of this patent is extended or adjusted under 35 U.S.C. 154(b) by 516 days.

This patent is subject to a terminal disclaimer.

(21) Appl. No.: 16/870,673

(22) Filed: May 8, 2020

(65) Prior Publication Data

US 2020/0354580 A1  Nov. 12, 2020

Related U.S. Application Data

(60) Provisional application No. 62/845,370, filed on May 9, 2019.

(51) Int. Cl.

| C09D 1/00 | (2006.01) |
|---|---|
| B05D 7/14 | (2006.01) |
| C09D 7/40 | (2018.01) |
| C09D 7/61 | (2018.01) |
| B05D 7/24 | (2006.01) |
| C09D 5/08 | (2006.01) |
| C23C 2/06 | (2006.01) |
| C09D 5/03 | (2006.01) |
| C23C 2/26 | (2006.01) |

(52) U.S. Cl.
CPC ............. *C09D 1/00* (2013.01); *B05D 7/14* (2013.01); *B05D 7/24* (2013.01); *C09D 5/031* (2013.01); *C09D 5/033* (2013.01); *C09D 5/08* (2013.01); *C09D 7/61* (2018.01); *C09D 7/69* (2018.01); *C09D 7/70* (2018.01); *C23C 2/06* (2013.01); *C23C 2/26* (2013.01); *B05D 2202/10* (2013.01); *B05D 2401/32* (2013.01)

(58) Field of Classification Search
CPC .......... C09D 1/00; C09D 5/031; C09D 5/033; C09D 5/08; C09D 7/61; C09D 7/69; C09D 7/70; C09D 5/084; C09D 1/02; C09D 7/67; B05D 7/14; B05D 7/24; B05D 2401/32; C23C 2/26; C23C 28/00; C08K 3/22; C08K 7/02; C04B 2111/00482; C04B 2103/54; C04B 20/006; C04B 18/082; C04B 20/008; C04B 14/4631; C04B 14/4625; C04B 14/386; C04B 14/30; C04B 41/5041; C04B 41/5024; C04B 14/465; C04B 14/305
USPC ............... 428/446; 427/397.7; 106/635, 632, 106/287.17, 286.6, 286.4, 286.5, 286.1
See application file for complete search history.

(56) References Cited

U.S. PATENT DOCUMENTS

| 8,197,593 B2 | 6/2012 | Balaguru | |
|---|---|---|---|
| 2015/0267060 A1* | 9/2015 | Mukhopadhyay | ..... C08G 77/30 359/601 |
| 2020/0354281 A1 | 11/2020 | Balaguru et al. | |
| 2020/0354581 A1 | 11/2020 | Balaguru et al. | |
| 2021/0214464 A1* | 7/2021 | Matsusue | .................. C08L 1/02 |

FOREIGN PATENT DOCUMENTS

GB   1595480 A  *  8/1981  ............... C09D 5/18

* cited by examiner

*Primary Examiner* — Sheng H Davis
*Assistant Examiner* — Ritu S Shirali
(74) *Attorney, Agent, or Firm* — Alan G. Towner; Leech Tishman Fuscaldo & Lampl

(57) ABSTRACT

Inorganic coatings that may be used to coat and protect galvanized steel are disclosed. The protective inorganic coatings include a liquid composition portion comprising water, alkali metal oxide components and a silicate-containing component. The coatings also include a powder composition portion comprising microspheres, metal oxide powder and optional microfibers. When applied to galvanized steel, the coatings provide chemical and physical protection.

28 Claims, No Drawings

PROTECTIVE COATINGS FOR GALVANIZED STEEL

CROSS-REFERENCE TO RELATED APPLICATION

This application claims the benefit of U.S. Provisional Patent Application Ser. No. 62/845,370 filed May 9, 2019, which is incorporated herein by reference.

FIELD OF THE INVENTION

The present invention relates to protective coatings, and more particularly relates to protective inorganic coating compositions that may be applied to galvanized steel.

BACKGROUND INFORMATION

Steel products are often subjected to galvanization processes. This is most commonly done by submerging the steel in a bath of molten zinc alloy, commonly known as hot-dip galvanizing. The purpose of applying zinc to steel is for corrosion protection. Zinc is a more noble metal when compared to steel, and acts as a sacrificial anode such that the zinc corrodes and sacrifices itself to protect the steel surface.

However, zinc creates unique challenges when trying to apply coatings. Zinc is known to be a chemically and dimensionally unstable element, so standard paints may not readily attach to zinc surfaces in a chemical manner. Additionally, when galvanized steel has been exposed to weathering conditions, different compounds are formed on the galvanized steel surface, including zinc oxide, zinc carbonate, zinc chloride and zinc sulfate.

SUMMARY OF THE INVENTION

The present invention provides protective coatings that are able to attach to zinc surface layers of galvanized steel substrates to thereby create a protective and durable surface. The protective inorganic coatings include a liquid composition portion comprising water, alkali metal oxide components and a silicate-containing component. The coatings also include a powder composition portion comprising microspheres, metal oxide powder and optional microfibers.

An aspect of the present invention is to provide a protective inorganic coating composition comprising: a liquid composition portion comprising by weight percent of the liquid composition portion from 48 to 65 weight percent water, from 20 to 28 weight percent of an alkali metal oxide component comprising potassium oxide, and from 18 to 28 weight percent of a silicate-containing component; and a powder composition portion comprising by weight percent of the powder composition portion from 20 to 80 weight percent microspheres, from 1 to 60 weight percent of at least one metal oxide powder comprising a Group II metal, Group IV metal, Group VI metal, Group X metal, Group XII metal or a combination thereof, and up to 50 weight percent microfibers.

Another aspect of the present invention is to provide a method of making a protective inorganic coating composition as described above. The method comprises adding the powder composition portion to the liquid composition portion, and mixing the powder composition portion and the liquid composition portion together.

A further aspect of the present invention is to provide a method of coating a substrate material by applying a protective inorganic coating as described above onto the substrate material.

Another aspect of the present invention is to provide a substrate coated with the protective inorganic coating described above.

These and other aspects of the present invention will be more apparent from the following description.

DETAILED DESCRIPTION

The present invention provides protective inorganic coating compositions comprising: a liquid composition portion comprising by weight percent of the liquid composition portion: from 48 to 65 weight percent water, from 20 to 28 weight percent of an alkali metal oxide component comprising potassium oxide, and from 18 to 28 weight percent of a silicate-containing component; and a powder composition portion comprising by weight percent of the powder composition portion; from 20 to 80 weight percent microspheres, from 1 to 60 weight percent of at least one metal oxide powder comprising a Group II metal, Group IV metal, Group VI metal, Group X metal, Group XII metal or a combination thereof, and up to 50 weight percent microfibers. In certain embodiments, the liquid composition portion comprises from 50 to 62 weight percent water, from 22 to 25 weigh percent alkali metal oxide component, and from 21 to 27 weight percent silicate-containing component, and the powder composition portion comprises from 25 to 50 weight percent microspheres, from 1 to 50 weight percent metal oxide powder, and from 1 to 20 weight percent microfibers. For example, the powder composition portion may comprise from 30 to 40 weight percent microspheres, from 2 to 30 weight percent metal oxide powder, and from 2 to 10 weight percent microfibers.

The liquid composition portion may comprise from 10 to 55 weight percent of the total weight of the coating composition, and the powder composition portion may comprise from 45 to 90 weight percent of the total weight of the coating composition. In certain embodiments, the liquid composition portion may comprise from 15 to 50 weight percent of the total weight of the coating composition, and the powder composition portion may comprise from 50 to 85 weight percent of the total weight of the coating composition. For example, the liquid composition portion may comprise from 20 to 45 weight percent of the total weight of the coating composition, and the powder composition portion may comprise from 55 to 80 weight percent of the total weight of the coating composition.

The silicate-containing component may comprise potassium silicate, and may, be provided in the form of a water-based solution containing the potassium silicate.

The microspheres may have a particle size from about 0.05 to about 10 µm, and may comprise at least one material selected from cenospheres, glass, pozzolan, ceramic, and composite.

The Group II metal oxide may be selected from calcium, beryllium, and magnesium oxides. The Group IV metal oxide ma be selected from titanium, zirconium, and hafnium oxides. The Groups II and IV metal oxides may have a maximum particle size of 25 µm, for example from 0.05 to 5 µm.

The coating compositions may also include microfibers such as silica, alumina, carbon, wollastonite, silicon carbide or a combination thereof. The microfibers may have an average aspect ratio of greater than 2:1, a maximum length of 500 μm, and a maximum diameter of 50 μm. For example, the microfibers may have an average aspect ratio of from 2:1 to 5:1 or 10:1, an average length of from 10 to 200 microns, and an average diameter of from 0.1 to 10 microns. The microfibers may comprise from 1 to 30 weight percent of the powder composition portion, for example, from 2 to 20 or from 5 to 10 weight percent of the powder composition portion.

The coating composition may further comprise alumina powder having an average particle size of from 50 nanometers to 5 μm in an amount up to 5 or 10 weight percent of the powder composition portion.

The coating composition may further comprise a sugar in an amount of from about 0.1 to about 1.5 or 2 weight percent of the total composition.

The compositions may further comprise a densifier such as silicic acid in an amount up to 10 weight percent of the total composition, ford example, from 0.5 to 5 weight percent, or from 1 to 3 weight percent.

The coating composition may further comprise standard colored pigments, for example, in an amount of from 0.1 to 10 weight percent of the coating composition.

In accordance with an embodiment of the present invention, a method for coating a substrate is provided, comprising applying the coating compositions described above onto a galvanized steel substrate and allowing the composition to cure or dry. The coating compositions may be applied by any suitable method such as spraying, painting, or dip coating the substrate with this composition.

The substrate may comprise iron, steel, or alloys thereof, with zinc deposited on its surface by hot-dip galvanizing, continuous sheet galvanizing, zinc rich painting, met lining, mechanical plating, electro-galvanizing, or zinc plating. As used herein, the term "galvanized steel" includes any type of iron, steel or alloys thereof having a zinc-containing layer applied to at least a portion of the surface thereof.

The present coatings chemically stabilize the deposited zinc, and may provide protection to the deposited zinc by isolating it from moisture, oxygen, carbon dioxide, carbonic acids, chlorides, and sulfur compounds.

An embodiment of the present invention provides a colorized ceramic coating that seals the galvanized zinc layer away from corrosive elements. Different colors, textures, and finishes may be provided to the galvanized steel surfaces. For example, the coating system may provide a natural satin finish and a nature-based color pallet. The coatings may also blend power towers and poles into their surroundings, while also preserving them from abrasion damage and graffiti.

Ceramic fibers and barrier particles added to the coating compositions may increase physical properties such as surface hardness, density and friction resistance to protect higher value assets in industrial settings.

The present coatings provide highly durable barriers against physical abuse that can be easily repaired without the need for stripping back down to the metal. The ability of this system to bond into itself means that some assets that experience high abrasion can be recoated while preserving the steel substrate indefinitely. Current repair methods rely on sacrificial, dimensionally unstable zinc that lacks resistance to abrasion, corrosive chlorides, and weathering.

The present coatings may be applied over clean, e.g., degreased, zinc-containing surfaces. Smooth surfaces should be lightly abraded and loose rust should be removed to provide a proper surface for attachment.

The extreme durability of the present coatings provide extreme long life for structures. Unlike leachable zing in galvanizing, the present coatings do not leach or deteriorate heavy metals to the environment, making them safe around critical streams, estuaries, ocean environments and the like.

The following examples are intended to illustrate various aspects of the present invention, and are not intended to limit the scope of the invention.

Example 1

A coating composition comprising three components is prepared: liquid, powder, and densifier. The liquid is made by blending a silicate-containing solution and potassium hydroxide flakes in water to create a binder solution. The powder is made by mixing the various raw components listed above. Microspheres represent 45-65% of the powder, by weight. Titanium, zirconium, hafnium, and aluminum oxides represent 20-35% of the powder, by weight. Calcium oxide represents 1% to about 3% of the powder, by weight. Sugar represents 1% to about 3% of the powder, by weight. Microfiber composed of wollastonite represents 5-10% of the powder, by weight. Discrete carbon fibers represent 5-10% of the powder, by weight. Densifier consisting of silicic acid is added to the liquid and powder at 1-5%, by weight.

Example 2

A coating consisting of the components of Example 1 is prepared, with 0.1-10% pigment(s) added, by weight, to create a colored coating.

Example 3

A coating consisting of the components of Example 1 is prepared by mixing the liquid, powder, and densifier components in either a high or low shear mixer (such as a paint mixing drill bit) to form a low-viscosity solution that can be applied to the surface of galvanized steel. The coating composition is applied to galvanized steel surfaces either by brush, roller, sprayer, or any other method typically used to apply coatings.

Example 4

A coating consisting of the components of Example 1 is applied to galvanized steel and allowed to dry, harden, and cure at room temperature on the galvanized steel surface.

Example 5

A coating consisting of the components of Example 1 is applied to a hot dipped galvanized surface. This stabilizes the surface chemistry, prevents the ingress of salts and other chemicals that negatively react with zinc, creates a surface resistance to abrasion, and creates an aesthetically pleasing surface.

Example 6

A coating consisting of the components of Example 1 is applied to a cold-galvanized surface. This stabilizes the surface chemistry, prevents the ingress of salts and other chemicals that negatively react with zinc, creates a surface resistance to abrasion, and creates an aesthetically pleasing surface.

Example 7

Physical testing, results for coated steel substrates are listed in Table 1 below. The coating composition included three components: liquid, powder, and densifier. The liquid portion is blend of a silicate-containing water-based solution 70% by weight, potassium hydroxide flakes 15% by weight, and water 15% by weight. The silicate-containing solution comprises about 61 weight percent water and about 39 weight percent potassium silicate and a combination of silicic acid and potassium salt, and is commercially available under the designation KASIL 6 Potassium Silicate Solution from PQ Corporation. The water contained in the silicate-containing solution and the separately added water provide a total water content of about 54 weight percent of the liquid portion. The powder portion is made by mixing pozzolan microspheres 60% by weight, zirconium oxide 12% by weight, titanium dioxide 15% by weight, microfiber wollastonite 9% by weight, discrete carbon fibers 2% by weight, calcium oxide 1% by weight, sugar 1% by weight. The densifier is silicic acid 100% by weight. The final composition comprises 38% by weight of the liquid portion, 61% by weight of the powder portion, and 1% by weight of the silicic acid densifier.

TABLE 1

PHYSICAL TESTING

| | |
|---|---|
| Dry Film Thickness | 4-8 Mils (100-200 Microns) |
| Adhesion by Knife (ASTM D6677) | Rating: 10/10 |
| Thermal Expansion | Galvanized Steel Compatible |
| Immersion in Water (ASTM D870) | 1000 Hours (No Corrosion) |
| Immersion in Saltwater (ASTM D870) | 1000 Hours (No Corrosion) |
| Hardness, Shore D (ASTM D2240) | 85.0 ± 5.0 |
| UVA/B 370 nmλ | No Chalking Occurred |
| | No Cracking Occurred |
| | No Delamination Occurred |
| Fire Rating (ASTM E84-15b) | Zero (0) Flame Spread |
| Smoke Generation (ASTM E84-15b) | Zero (0) Smoke |

For purposes, of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the suffice. For example, a coating composition "deposited onto" a galvanized steel substrate does not preclude the presence of one or, more other intervening coating layers of the same or different composition located between the coating composition and the substrate.

Whereas particular embodiments of this invention have been described above for purposes of illustration, it will be evident to those skilled in the art that numerous variations of the details of the present invention may be made without departing from the invention as defined in the appended claims.

What is claimed is:

1. A protective inorganic coating composition comprising:
   a liquid composition portion comprising by weight percent of the liquid composition portion: from 48 to 65 weight percent water, from 20 to 28 weight percent of an alkali metal oxide component comprising potassium oxide, and from 18 to 28 weight percent of a silicate-containing component;
   a powder composition portion comprising by weight percent of the powder composition portion: from 20 to 80 weight percent microspheres, from 1 to 60 weight percent of at least one metal oxide powder comprising a Group II metal, Group IV metal, Group VI metal, Group X metal, Group XII metal or a combination thereof, and up to 50 weight percent microfibers; and
   from 0.5 to 10 weight percent of a densifier comprising silicic acid based on the total weight of the coating composition.

2. The protective inorganic coating composition of claim 1, wherein the water comprises from 50 to 62 weight percent, the alkali metal oxide component comprises from 22 to 25 weight percent, and the silicate-containing component comprises from 21 to 27 weight percent.

3. The protective inorganic coating composition of claim 1, wherein the microspheres comprise from 25 to 50 weight percent, the at least one metal oxide powder comprises from 1 to 50 weight percent, and the microfibers comprise from 1 to 30 weight percent.

4. The protective inorganic coating composition of claim 1, wherein the microspheres comprise from 30 to 40 weight percent, the at least one metal oxide powder comprises from 2 to 30 weight percent, and the microfibers comprise from 2 to 20 weight percent.

5. The protective inorganic coating composition of claim 1, wherein the liquid composition portion comprises from 10 to 55 weight percent of the total weight of the coating composition, and the powder composition portion comprises from 45 to 90 weight percent of the total weight of the coating composition.

6. The protective inorganic coating composition of claim 1, wherein the liquid composition portion comprises from 15 to 50 weight percent of the total weight of the coating composition, and the powder composition portion comprises from 50 to 85 weight percent of the total weight of the coating composition.

7. The protective inorganic coating composition of claim 1, wherein the liquid composition portion comprises from 20 to 45 weight percent of the total weight of the coating composition, and the powder composition portion comprises from 55 to 80 weight percent of the total weight of the coating composition.

8. The protective inorganic coating composition of claim 1, wherein the microspheres have an average particle size of from 0.05 to 10 microns.

9. The protective inorganic coating composition of claim 1, wherein the microspheres comprise at least one material selected from cenospheres, glass, pozzolan, ceramic, and composite.

10. The protective inorganic coating composition of claim 1, wherein the microspheres comprise cenospheres, ceramic, pozzolan or a combination thereof.

11. The protective inorganic coating composition of claim 1, wherein the at least one metal oxide powder has a maximum particle size of 25 microns.

12. The protective inorganic coating composition of claim 1, wherein the at least one metal oxide powder has an average particle size of from 0.05 to 5 microns.

13. The protective inorganic coating composition of claim 1, wherein the Group II metal oxide is selected from calcium, beryllium and magnesium oxides, and the Group IV metal oxide is selected from titanium, zirconium and hafnium oxides.

14. The protective inorganic coating composition of claim 1, wherein the metal oxide powders comprise titanium oxide, zirconium oxide, hafnium oxide and calcium oxide.

15. The protective inorganic coating composition of claim 1, wherein the powder composition portion comprises alumina powder having an average particle size of from 50 nanometers to 5 microns.

16. The protective inorganic coating composition of claim 1, wherein the microfibers have an average aspect ratio of at least 2:1, a maximum length of 500 microns, and a maximum diameter of 50 microns.

17. The protective inorganic coating composition of claim 1, wherein the microfibers have an average aspect ratio of from 2:1 to 5:1, an average length of from 10 to 200 microns, and an average diameter of from 0.1 to 10 microns.

18. The protective inorganic coating composition of claim 1, wherein the microfibers comprise from 5 to 10 weight percent of the powder composition portion.

19. The protective inorganic coating composition of claim 1, wherein the microfibers comprise wollastonite, silica, alumina, carbon, silicon carbide, or a combination thereof.

20. The protective inorganic coating composition of claim 1, wherein the microfibers comprise wollastonite, carbon or a combination thereof.

21. The protective inorganic coating composition of claim 1, wherein the powder composition portion further comprises sugar in an amount of from 0.1 to 2 weight percent based on the weight of the powder composition portion.

22. The protective inorganic coating composition of claim 1, wherein the coating composition comprises from 1 to 5 weight percent of the densifier based on the total weight of the coating composition.

23. The protective inorganic coating composition of claim 1, wherein the coating composition further comprises a pigment in an amount of from 0.1 to 10 weight percent based on the total weight of the coating composition.

24. A method of making the protective inorganic coating composition as recited in claim 1, the method comprising adding the powder composition portion of claim 1 to the liquid composition portion of claim 1, and mixing the powder composition portion and the liquid composition portion, and adding the densifier to the mixed powder composition portion and liquid composition portion to produce the protective inorganic coating composition of claim 1.

25. A method of coating a substrate material by applying the protective inorganic coating composition of claim 1 onto the substrate material.

26. The method of claim 25, wherein the substrate material comprises galvanized steel.

27. A substrate coated with the protective inorganic coating composition of claim 1.

28. The coated substrate of claim 27, wherein the substrate comprises galvanized steel.

* * * * *